US012679931B2

(12) United States Patent
Wang et al.

(10) Patent No.: US 12,679,931 B2
(45) Date of Patent: Jul. 14, 2026

(54) METHOD FOR PREPARING POLYETHER AMINE CATALYST, AND POLYETHER AMINE

(71) Applicants: Zhejiang Huangma Technology Co., Ltd., Shaoxing (CN); Zhejiang Lukean Chemical Co., Ltd., Shaoxing (CN); Zhejiang Huangma Shangyi New Material Co., Ltd., Shaoxing (CN); Shangyu Huangma Surface Activated Reagent Research Institute Co., Ltd., Shaoxing (CN)

(72) Inventors: Weisong Wang, Shaoxing (CN); Majishi Wang, Shaoxing (CN); Jiang Yu, Shaoxing (CN); Shengli Wang, Shaoxing (CN); Yifeng Jin, Shaoxing (CN); Shicong Zhao, Shaoxing (CN); Minggui Song, Shaoxing (CN)

(73) Assignees: Zhejiang Huangma Technology Co., Ltd., Shaoxing (CN); Zhejiang Lukean Chemical Co., Ltd., Shaoxing (CN); Zhejiang Huangma Shangyi New Material Co., Ltd., Shaoxing (CN); Shangyu Huangma Surface Activated Reagent Research Institute Co., Ltd., Shaoxing (CN)

( * ) Notice: Subject to any disclaimer, the term of this patent is extended or adjusted under 35 U.S.C. 154(b) by 718 days.

(21) Appl. No.: 18/076,365

(22) Filed: Dec. 6, 2022

(65) Prior Publication Data

US 2023/0303769 A1 Sep. 28, 2023

(30) Foreign Application Priority Data

Mar. 28, 2022 (CN) ......................... 202210310171.9

(51) Int. Cl.

| | |
|---|---|
| ***B01J 21/04*** | (2006.01) |
| ***B01J 21/18*** | (2006.01) |
| ***B01J 23/72*** | (2006.01) |
| ***B01J 23/74*** | (2006.01) |
| ***B01J 23/755*** | (2006.01) |
| ***B01J 37/02*** | (2006.01) |
| ***B01J 37/08*** | (2006.01) |
| ***B01J 37/16*** | (2006.01) |
| ***C08G 65/26*** | (2006.01) |

(52) U.S. Cl.

CPC ............ *C08G 65/269* (2013.01); *B01J 21/04* (2013.01); *B01J 21/18* (2013.01); *B01J 23/72* (2013.01); *B01J 23/74* (2013.01); *B01J 37/0205* (2013.01); *B01J 37/08* (2013.01); *B01J 37/16* (2013.01); *B01J 2231/10* (2013.01); *B01J 2523/17* (2013.01); *B01J 2523/31* (2013.01); *B01J 2523/845* (2013.01); *B01J 2523/847* (2013.01)

(58) Field of Classification Search

CPC ........ B01J 21/04; B01J 23/0205; B01J 23/08; B01J 23/16; B01J 23/72; B01J 23/74; B01J 21/18; B01J 37/0205; B01J 37/08; B01J 37/16; B01J 2231/10; B01J 2523/17; B01J 2523/31; B01J 2523/845; B01J 2523/847; B01J 23/755; C08G 65/269; C08G 65/3255; C08G 2650/04

USPC .......................................................... 502/245

See application file for complete search history.

(56) References Cited

U.S. PATENT DOCUMENTS

| | | | | |
|---|---|---|---|---|
| 3,953,363 | A * | 4/1976 | Yamauchi | B01J 23/8926 502/178 |
| 4,200,552 | A * | 4/1980 | Noguchi | B01J 21/04 502/355 |
| 5,968,869 | A * | 10/1999 | Nicolau | B01J 23/8926 502/262 |
| 7,696,384 | B2 * | 4/2010 | Cauwenberge | C07D 295/02 564/463 |
| 2022/0161237 | A1 * | 5/2022 | Wloka | B01J 37/088 |
| 2022/0352570 | A1 * | 11/2022 | Rohde | C22B 7/004 |

FOREIGN PATENT DOCUMENTS

| | | | |
|---|---|---|---|
| CN | 102336903 | A | 2/2012 |
| CN | 101522607 | B | 3/2014 |
| CN | 104119239 | A | 10/2014 |
| CN | 104693434 | A | 6/2015 |
| CN | 106957420 | A | 7/2017 |

* cited by examiner

*Primary Examiner* — Cam N. Nguyen

(57) ABSTRACT

The present invention relates to a method for preparing a polyether amine catalyst, and polyether amine. A polyether amine catalyst is a supported metal catalyst; $\gamma$-$Al_2O_3$ is used as a carrier; basic cupric carbonate, basic nickel carbonate and basic cobalt carbonate are used as precursors of supported metals; and the polyether amine catalyst is prepared by performing twice adsorption roasting and once reduction by means of an equivalent-volumetic impregnation method. Easier decomposition is achieved by using basic carbonate, and only water and carbon dioxide are generated, such that processes and costs for treating waste gases can be saved. By using the polyether amine catalyst to prepare polyether amine, a conversion rate and primary amine selectivity can be improved, and the color of products can be reduced. Therefore, the obtained polyether amine can have higher activity and wider application.

5 Claims, 1 Drawing Sheet

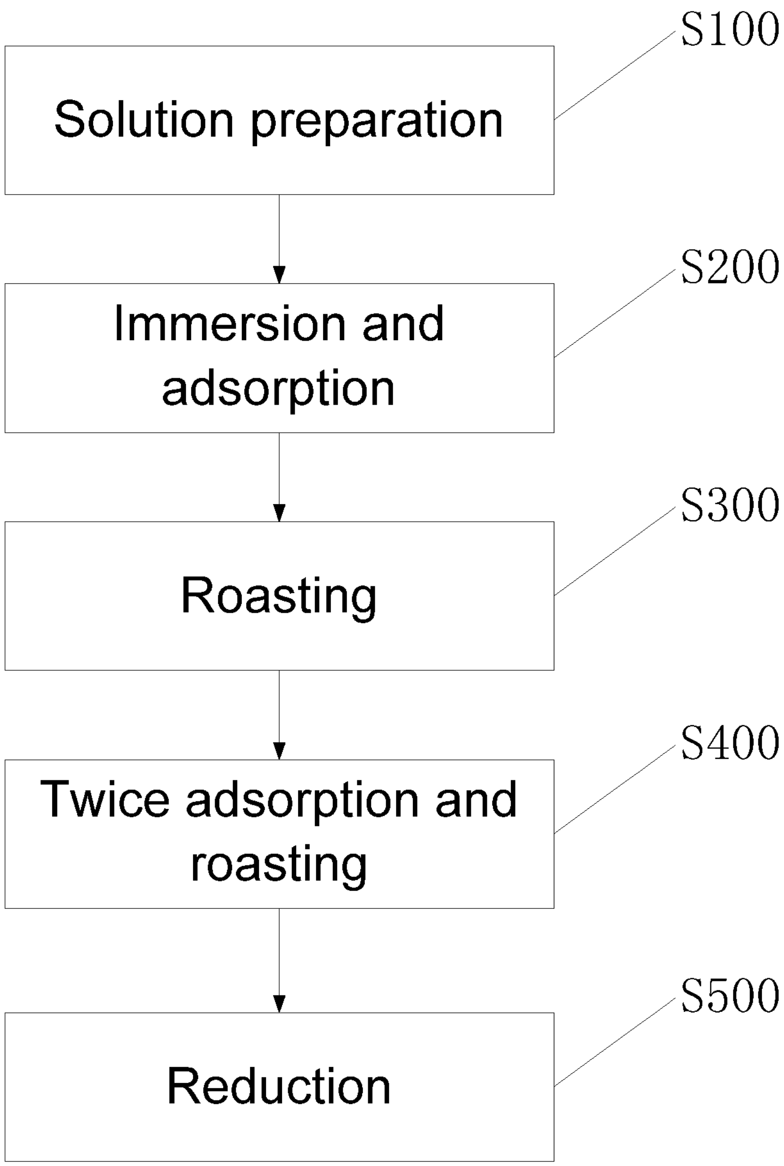
Solution preparation
S100
Immersion and adsorption
S200
Roasting
S300
Twice adsorption and roasting
S400
Reduction
S500

METHOD FOR PREPARING POLYETHER AMINE CATALYST, AND POLYETHER AMINE

CROSS-REFERENCE TO RELATED APPLICATION

The present application claims priority from Chinese Patent Application No. 202210310171.9 filed on Mar. 28, 2022, the contents of which are incorporated herein by reference in their entirety.

TECHNICAL FIELD

The present invention belongs to the technical field of organic polymer compounds, and specifically, to a method for preparing a polyether amine catalyst, and polyether amine.

BACKGROUND

Polyether amine (PEA) is also known as Amine-Terminated Polyethers (ATPE), which is a compound which uses a polyalkyl oxide structure as a main chain and uses terminal amino as an active functional group. Most of these PEA are made from polyether polyols; and by using different treatment methods, the terminal hydroxyls of the polyether polyols are converted into the amino. Since the amino hydrogen at the terminal of the PEA has stronger reactivity than the hydroxyl hydrogen at the terminal of polyether, the PEA can react with various compounds, such as epoxy groups and isocyanate groups. In addition, due to the presence of an ether bond in the PEA, the PEA is easier to dissolve in various compounds, thereby greatly expanding the application range of the PEA in the industrial field. According to the number of substituted hydrogen atoms in the amino groups, the PEA may further be classified into primary amine PEA and secondary amine PEA. For the PEA terminated with tertiary amino groups, since there is no active hydrogen connected to nitrogen atoms, there is basically no corresponding reactivity, such that products with low molecular weight can only be used as some industrial solvents. The common PEA in industry is primary amine PEA such as polyethylene oxide diamine, polypropylene oxide diamine, or polyethylene oxide/polypropylene oxide diamine. By means of selecting different polyalkyl oxide structures, performance after amination such as reactivity, toughness, viscosity and hydrophilicity is changed accordingly. Currently, commercial PEA include monofunctional (M-series) PEA, bifunctional (D-series) PEA and trifunctional (T-series) PEA. Due to excellent performance, a range of products with molecular weights ranging from 230 to 5000 are widely applied to the fields such as surfactants, epoxy resin modifiers, polyurethane (polyurea) industries, gasoline detergent dispersants and the like. Due to late starting of domestic research and development of PEA, there is a great gap in terms of product specifications, quantity and quality compared with foreign countries, resulting in high import price of the PEA. Therefore, there is an urgent need to develop new product technologies of the PEA, simplify process routes, develop novel catalyst varieties, moderate reaction conditions, reduce costs and improve quality.

However, the applicant discovered that, methods for synthesizing the PEA mainly include a catalytic reduction amination method, a leaving group method, a hydrolysis method and a nitro terminated method. Currently, the catalytic reduction amination method is mainly used in industry, which is essentially to directly perform hydrogen catalytic reduction amination on a mixture of polyether, ammonia and hydrogen at a certain temperature and pressure and under the presence of a catalyst, so as to produce the PEA. For polyether with different structure distribution and molecular weight, the catalytic reduction amination method may be divided into an intermittent autoclave reaction and a continuous fixed bed reaction. The continuous reaction is advanced in process route, easy in control, simple in operation, high in production efficiency, short in production cycle and high in product quality, such that the continuous reaction has become a mainstream process route for industrialization.

Disclosed in CN104119239A is a method of continuous production for small molecular weight polyether amine. A continuous fixed bed process is used; 2-6 reactors are connected in series; and by means of filling different Raney metal catalysts and supported metal catalysts or catalysts with different nickel and cobalt contents, the impact of generated water on the catalysts can be reduced, thereby increasing the conversion rate of reaction. The temperature of the reactors is 180-240° C., and the pressure is 11.5-19.5 MPa; and a mole ratio of hydroxyl contained in polyether to liquid ammonia is 1:20-80, and a mole ratio of the hydroxyl to hydrogen is 1:0.4-5.

Disclosed in CN104693434A is a method for continuously synthesizing polyether amine by using a fixed bed. Polyether polyol is uniformly mixed with liquid ammonia by means of spraying, and is then mixed with hydrogen. Then, in a fixed bed reactor of an activated skeleton nickel catalyst containing supported nickel, copper and lanthanum, a hydrogen ammoniation reaction occurs under reaction conditions of 130-280° C. and 3.0-15.0 MPa. Continuous discharging is performed by means of gas-liquid separation; and the PEA is obtained by performing vacuum rotary evaporation dehydration and deamination on the product. Therefore, the method is a polyether amine production method that is easy to implement automatic control.

The key to the preparation of the polyether amine is the selection and preparation of catalysts. Currently, the most commonly used catalysts in industry are supported metal catalysts, the vast majority of which use alumina as carriers and use copper, chromium and nickel as the main active components of the catalysts.

Disclosed in CN106957420A is a method for preparing a supported alumina catalyst. According to the total amount of a catalyst, the catalyst includes 5-15% of nickel, 5-10% of cobalt. 2-10% of rhenium, 1-5% of molybdenum, with 1-5% of rhenium, and the balancing being a carrier $Al_2O_3$.

Disclosed in CN102336903A is a method for preparing a Raney nickel/aluminum catalyst. The catalyst includes 85-95% of nickel and 5-15% of aluminum.

The method for preparing a catalyst uses an equivalent-volumetic impregnation method, and uses nitrate as the precursor of metal salt. But toxic nitrogen oxides are released during a roasting process, which seriously pollute the environment. One-time immersion roasting is performed, resulting in poor metal adsorption effect and easy metal loss; and the prepared catalyst is poor in catalytic effect and short in service life.

In view of this, there is a great need to develop a novel catalyst with low cost and green preparation process for the synthesis of PEA.

SUMMARY

In order to overcome the deficiency in the prior art, the present invention is intended to provide a method for preparing a polyether amine catalyst that is simple in process and green, environmentally-friendly and pollution-free and can save processes and costs for treating waste gases. γ-$Al_2O_3$ having characteristics of a large specific surface area, strong adsorbability, high temperature resistance and high-pressure resistance is used as a carrier. Meanwhile, by means of twice adsorption and roasting, more balanced adsorption of metal can be achieved, and the metal is not easy to lose. The finally prepared polyether amine catalyst has high activity and selectivity, and is long in service life and wide in application range. By using the polyether amine catalyst to prepare polyether amine, a conversion rate and primary amine selectivity can be improved, and the color of products can be reduced. Therefore, the obtained polyether amine can have higher activity and wider application.

In order to solve the above problems, the technical solutions used in the present invention include the following.

The present invention provides a method for preparing a polyether amine catalyst. A polyether amine catalyst is a supported metal catalyst; γ-$Al_2O_3$ is used as a carrier; basic cupric carbonate, basic nickel carbonate and basic cobalt carbonate are used as precursors of supported metals; and the polyether amine catalyst is prepared by performing twice adsorption roasting and once reduction by means of an equivalent-volumetic impregnation method. The method specifically includes the following steps.

S1. Solution preparation: basic cupric carbonate, basic nickel carbonate and basic cobalt carbonate are added to deionized water, and stirring is performed until the basic cupric carbonate, the basic nickel carbonate and the basic cobalt carbonate are completely dissolved, so as to obtain a solution A.

S2. Immersion and adsorption: an alumina carrier is impregnated into the solution A obtained in S1, the solution is allowed to stand after rotary immersion in a water bath, after the adsorption equilibrium of the alumina carrier, temperature rising, vacuum dehydration and drying are performed, and then the alumina carrier is taken out, so as to obtain an intermediate carrier.

S3. Roasting: the intermediate carrier obtained in S2 is put into a muffle furnace for temperature programming, and roasting is performed at a set temperature.

S4. Twice adsorption and roasting: the intermediate carrier roasted in S3 is used as a carrier, and S2 and S3 are repeated for twice adsorption and roasting. A metal salt ratio during secondary immersion is the same as a ratio during first immersion.

S5. Reduction: after cooling, at a certain temperature and a hydrogen atmosphere in a reduction furnace, rotary reduction is performed on the intermediate carrier after adsorption and twice roasting, that is, the reduction furnace is set to a slow rotational speed, to cause the carrier to fully contact with hydrogen, reduction is performed for a certain period of time, and then a polyether amine catalyst using γ-$Al_2O_3$ as a carrier may be obtained.

Further, a water bath temperature in S2 is 40° C.; the time for rotary immersion is 30 min; standing time is 30 min; and vacuum dehydration is performed when the temperature rises to 90° C.

Further, a roasting temperature in S3 is 420° C.; and roasting time is 5 h.

Further, S5 specifically comprises: putting the intermediate carrier after adsorption and twice roasting into the reduction furnace, performing rotary reduction for 60 h at 420° C. and a high-flow hydrogen atmosphere, then cooling the temperature to 150° C., converting hydrogen into high-pure nitrogen, and performing passivating treatment on a surface of the catalyst, so as to obtain the polyether amine catalyst using γ-$Al_2O_3$ as the carrier.

Further, a stirring temperature in S1 is 60° C.; and stirring time is 30 min.

The present invention further provides polyether amine. Polyether polyol is used for hydrogen ammoniation reaction synthesis; and during the hydrogen ammoniation reaction, the polyether amine catalyst obtained by means of the preparation method is used as a catalyst. A specific step includes: using a continuous fixed bed process, introducing ammonia and hydrogen under a condition that the space velocity of the polyether polyol is 0.1 $h^{-1}$-0.3 $h^{-1}$, and performing the hydrogen ammoniation reaction under the action of the polyether amine catalyst.

Further, the molar weights of the introduced ammonia and hydrogen respectively are 5-15 times and 3-8 times of polyether polyol; and the reaction temperature of the hydrogen ammoniation reaction is 180° C.-200° C., and the reaction pressure is 8-12 MPa.

Further, the polyether polyol contains one of EO, PO, EO/PO skeletons, and has an average molecular weight being 200-2000.

Compared with the prior art, the present invention has the following beneficial effects.

(1) A salt used by the polyether amine catalyst during preparation is basic carbonate; and compared with a traditional nitrate roasting process in which produced toxic nitrogen oxides pollute the environment, the catalyst is easier to decompose, and only water and carbon dioxide are generated, such that processes and costs for treating waste gases can be saved.

(2) γ-$Al_2O_3$ is used as the carrier, and has a regular porous structure and a large specific surface area compared with an activated carbon carrier, such that the γ-$Al_2O_3$ has a large adsorption capacity, and also has valuable properties, such as acid resistance, heat resistance, pressure resistance, and high abrasion strength as a catalyst carrier. Therefore, the structure of the γ-$Al_2O_3$ is not easy to damage in a high temperature and high-pressure reaction environment.

(3) Traditional catalyst preparation processes use one-time immersion and roasting methods, which case the loss insufficient adsorption of the metal and the reduction of the activity of the catalyst. In this application, by using a twice immersion method, metal adsorption is more sufficient and uniform, and the metal content of the prepared catalyst can reach a desired value. In addition, the poor effect of one-time roasting may cause excessive content of residual basic carbonate, and the basic carbonate cannot be completely converted into the metal, such that the activity of the catalyst is greatly reduced. In this application, by means of twice immersion, the basic carbonate can be fully converted into oxides, such that a solid foundation can be established for the following-up reduction.

(4) The reduction process is longer in time and higher in hydrogen content, which allows the metal oxide to be completely reduced to the metal and adsorb the metal on the carrier; after reduction is completed, high pure nitrogen is introduced for passivation, such that the catalyst can be prevented from being oxidized in large area due to contact with air during transportation; and after the catalyst is added to a reactor, hydrogen is then introduced to activate the catalyst, such that hydrogen ammoniation reaction of the polyether amine may be performed. In this way, the synthesized polyether amine has high conversion rate and selectivity, and a light color.

BRIEF DESCRIPTION OF THE DRAWINGS

The sole figure is a schematic flowchart of a method for preparing a polyether amine catalyst according to the present invention.

DETAILED DESCRIPTION OF THE EMBODIMENTS

To make the objectives, technical solutions and advantages of the present invention clearer, the invention is further described in detail with reference to the drawings and embodiments. It should be understood that the specific examples described here are merely used to explain the invention, and are not used to limit the invention.

Referring to the sole figure, the present invention provides a method for preparing a polyether amine catalyst. A polyether amine catalyst is a supported metal catalyst; γ-$Al_2O_3$ is used as a carrier; basic cupric carbonate, basic nickel carbonate and basic cobalt carbonate are used as precursors of supported metals; and the polyether amine catalyst is prepared by performing twice adsorption roasting and once reduction by means of an equivalent-volumetic impregnation method. The method specifically includes the following specific steps.

At S100, solution preparation: basic cupric carbonate, basic nickel carbonate and basic cobalt carbonate are added to deionized water, and stirring is performed until the basic cupric carbonate, the basic nickel carbonate and the basic cobalt carbonate are completely dissolved, so as to obtain a solution A. A stirring temperature is preferably 60° C., and stirring time is preferably 30 min.

At S200, immersion and adsorption: an alumina carrier is impregnated into the solution A obtained in S1, the solution is allowed to stand after rotary immersion in a water bath, after the adsorption equilibrium of the alumina carrier, temperature rising, vacuum dehydration and drying are performed, and then the alumina carrier is taken out, so as to obtain an intermediate carrier. A water bath temperature is preferably 40° C., the time for rotary immersion is preferably 30 min, standing time is preferably 30 min, and vacuum dehydration is performed when the temperature rises to 90° C.

At S300, roasting: the intermediate carrier obtained in S2 is put into a muffle furnace for temperature programming, and roasting is performed at a set temperature. A roasting temperature is preferably 420° C., and roasting time is preferably 5 h.

At S400, twice adsorption and roasting: the intermediate carrier roasted in S3 is used as a carrier, S2 and S3 are repeated for twice adsorption and roasting; and the ratio of a metal salt is adjusted when S2 is repeated.

At S500, reduction: after cooling, at a certain temperature and a hydrogen atmosphere in a reduction furnace, rotary reduction is performed on the intermediate carrier after adsorption and twice roasting, so as to obtain a polyether amine catalyst using γ-$Al_2O_3$ as a carrier. The step specifically includes: putting the intermediate carrier after adsorption and twice roasting into the reduction furnace, performing rotary reduction for 60 h at 420° C. and a high-flow hydrogen atmosphere, then cooling the temperature to 150° C., converting hydrogen into high-pure nitrogen, and performing passivating treatment on a surface of the catalyst, so as to obtain the polyether amine catalyst using γ-$Al_2O_3$ as the carrier.

The present invention further provides polyether amine. Polyether polyol is used for hydrogen ammoniation reaction synthesis; and during the hydrogen ammoniation reaction, the polyether amine catalyst obtained by means of the preparation method is used as a catalyst. A specific step includes: using a continuous fixed bed process, introducing ammonia and hydrogen under a condition that the space velocity of the polyether polyol is 0.1 $h^{-1}$-0.3 $h^{-1}$, and performing the hydrogen ammoniation reaction under the action of the polyether amine catalyst. The molar weights of the introduced ammonia and hydrogen are preferably 5-15 times and 3-8 times of polyether polyol; and the reaction temperature of the hydrogen ammoniation reaction is 180° C.-200° C., and the reaction pressure is 8-12 MPa. The polyether polyol contains one of EO, PO, EO/PO skeletons, and has an average molecular weight being 200-2000.

The method for preparing a polyether amine catalyst in the present invention is simple in process, green, environmentally-friendly and pollution-free in preparation process, high in catalytic activity, long in service life and wide in application range, and has an excellent application prospect. In addition, the conversion rate and primary amine selectivity of the polyether amine can be greatly enhanced, and the color of the polyether amine can also be reduced, such that the obtained polyether amine can have higher activity and wider application.

The method for preparing a polyether amine catalyst, and the polyether amine in the present invention are further described below with reference to the embodiments and comparative examples.

In the following embodiments, for a method for measuring a hydroxyl value, refer to GB/T 12008.3-2009, and a molecular weight is calculated. The method for measuring a total amine value uses a 0.5 mol/L hydrochloric acid solution to titrate a product. The total amine value of the product can be calculated by means of the volume of hydrochloric acid consumed. A method for measuring a primary amine value uses a reaction of salicylaldehyde with primary amine, then performs titration with hydrochloric acid, and subtracts a secondary amine value and a tertiary amine value from the total amine value, so as to calculate the primary amine value in a test sample. An amination conversion rate and a primary amine rate are calculated according to a formula (1) and a formula (2).

$$\text{Amination conversion rate}=\text{total amine value}/\text{hydroxyl value}\times 100\% \quad (1)$$

$$\text{Primary amine rate}=\text{primary amine value}/\text{total amine value}\times 100\% \quad (2)$$

Embodiment 1

1. The preparation of a polyether amine catalyst: 450 g of basic nickel carbonate, 50 g of basic cupric carbonate and 30 g of basic cobalt carbonate are first added to deionized water, heated to 40° C. and stirred to cause the basic nickel carbonate, the basic cupric carbonate and the basic cobalt carbonate to be fully dissolved, so as to prepare a solution; then, an equivalent-volumetic impregnation method is used to immerse 700 g of a weighed γ-$Al_2O_3$ into the above mixed solution, rotary immersion is performed for 30 min in a 40° C. water bath, after adsorption is balanced, the temperature is heated to 90° C., vacuum dehydration and drying are performed, and then roasting is performed for 4 h at 400° C.; next, the roasted catalyst carrier is reused as a carrier, then a metal salt solution is prepared according to the same ratio, and secondary immersion, adsorption and roasting are performed; and finally, after cooling, rotary reduction is performed on the carrier after twice roasting for 60 h at 420° C. and hydrogen atmosphere in the reduction furnace, such that a self-made polyether amine catalyst (supported metal catalyst) may be obtained.

2. A synthetic chemical equation of the polyether amine is shown as follows.

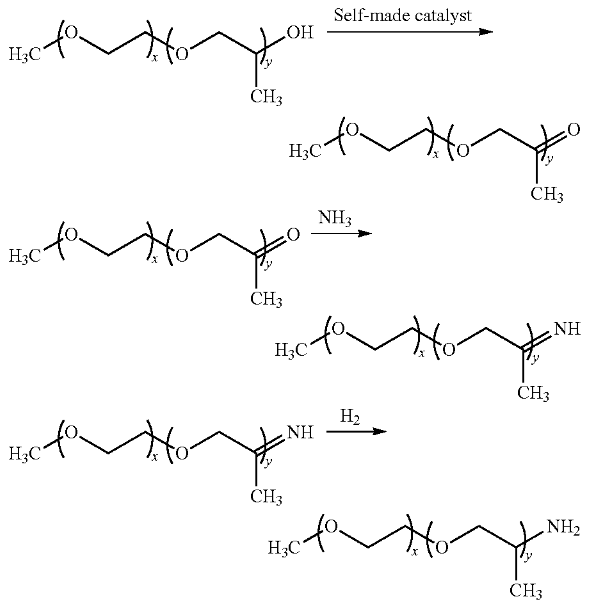

Where, x=31, y=11.

The synthesis of methanol polyoxyethylene polyoxypropylene ether monoamine (M-2070): the prepared polyether amine catalyst is added to a fixed bed reactor in advance, the hydrogen is first introduced to activate the polyether amine catalyst, a raw material methanol polyether is pumped by using a raw material booster pump at a space speed of 0.1 $h^{-1}$, liquid ammonia is pumped by using a liquid ammonia booster pump at a space speed of 0.15 $h^{-1}$, and several volumes of hydrogen are introduced by using a hydrogen booster pump; then, the temperature is heated to 180° C., a hydrogen ammoniation reaction is performed by adjusting a back pressure valve under the system pressure of 8.0 Mpa, after the reaction is performed for a period of time, products are started to be collected, and then post-treatment is performed to obtain a polyether amine M-2070 product; and the total amine value of the polyether amine M-2070 obtained according to the above measurement method is greater than 27.5, the conversion rate may reach more than 97.0%, and the primary amine selectivity may reach 98.0%. Samples for testing are taken at regular intervals. Experimental results show good repeatability, and the catalyst is stable.

Embodiment 2

1. The preparation of a polyether amine catalyst: 400 g of basic nickel carbonate, 80 g of basic cupric carbonate and 50 g of basic cobalt carbonate are first added to deionized water, heated to 40° C. and stirred to cause the basic nickel carbonate, the basic cupric carbonate and the basic cobalt carbonate to be fully dissolved, so as to prepare a solution; then, an equivalent-volumetic impregnation method is used to immerse 800 g of a weighed γ-$Al_2O_3$ into the above mixed solution, rotary immersion is performed for 30 min in a 40° C. water bath, after adsorption is balanced, the temperature is heated to 90° C., vacuum dehydration and drying are performed, and then roasting is performed for 6 h at 420° C.; next, the roasted catalyst carrier is reused as a carrier, then a metal salt solution is prepared according to the same ratio, and secondary immersion, adsorption and roasting are performed; and finally, after cooling, rotary reduction is performed on the carrier after twice roasting for 70 h at 420° C. and hydrogen atmosphere in the reduction furnace, such that a self-made polyether amine catalyst (supported metal catalyst) may be obtained.

2. A synthetic chemical equation of the polyether amine is shown as follows.

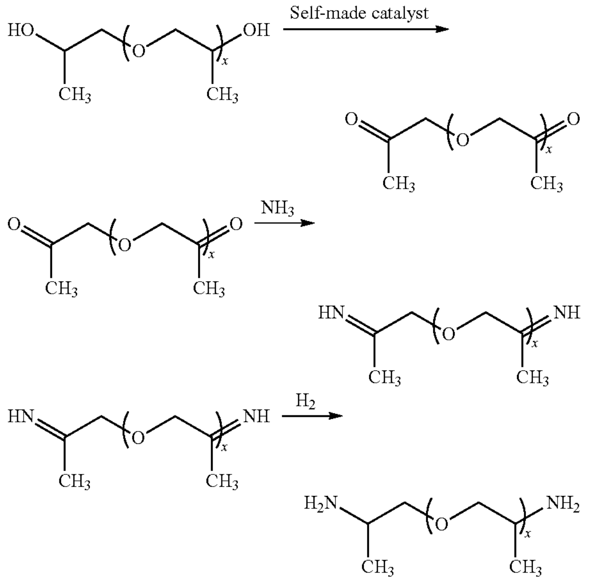

Where, x=3.

The synthesis of polypropylene oxide diamine (D-230): the prepared polyether amine catalyst is added to a fixed bed reactor in advance, the hydrogen is first introduced to activate the polyether amine catalyst, propylene glycol polyether is pumped by using a raw material booster pump at a space speed of 0.2 $h^{-1}$, liquid ammonia is pumped by using a liquid ammonia booster pump at a mass space speed of 0.25 $h^{-1}$, and several volumes of hydrogen are introduced by using a hydrogen booster pump; then, the temperature is heated to 200° C., a hydrogen ammoniation reaction is performed by adjusting a back pressure valve under the system pressure of 12.0 Mpa, after the reaction is performed for a period of time, products are started to be collected, and then post-treatment is performed to obtain a polyether amine D-230 product; and the total amine value of the polyether amine D-230 obtained according to the above measurement method is greater than 465, the conversion rate may reach more than 98.5%, and the primary amine selectivity may reach 99.5%. Samples for testing are taken at regular intervals. Experimental results show good repeatability, and the catalyst is stable.

Embodiment 3

1. The preparation of a polyether amine catalyst: 350 g of basic nickel carbonate, 100 g of basic cupric carbonate and 80 g of basic cobalt carbonate are first added to deionized water, heated to 40° C. and stirred to cause the basic nickel carbonate, the basic cupric carbonate and the basic cobalt carbonate to be fully dissolved, so as to prepare a solution; then, an equivalent-volumetic impregnation method is used to immerse 700 g of a weighed γ-$Al_2O_3$ into the above mixed solution, rotary immersion is performed for 30 min in a 40° C. water bath, after adsorption is balanced, the temperature is heated to 90° C., vacuum dehydration and drying are performed, and then roasting is performed for 8 h at 410° C.; next, the roasted catalyst carrier is reused as a carrier, then a metal salt solution is prepared according to the same ratio, and secondary immersion, adsorption and roasting are performed; and finally, after cooling, rotary reduction is performed on the carrier after twice roasting for 60 h at 420° C. and hydrogen atmosphere in the reduction furnace, such that a self-made polyether amine catalyst (supported metal catalyst) may be obtained.

2. A synthetic chemical equation of the polyether amine is shown as follows.

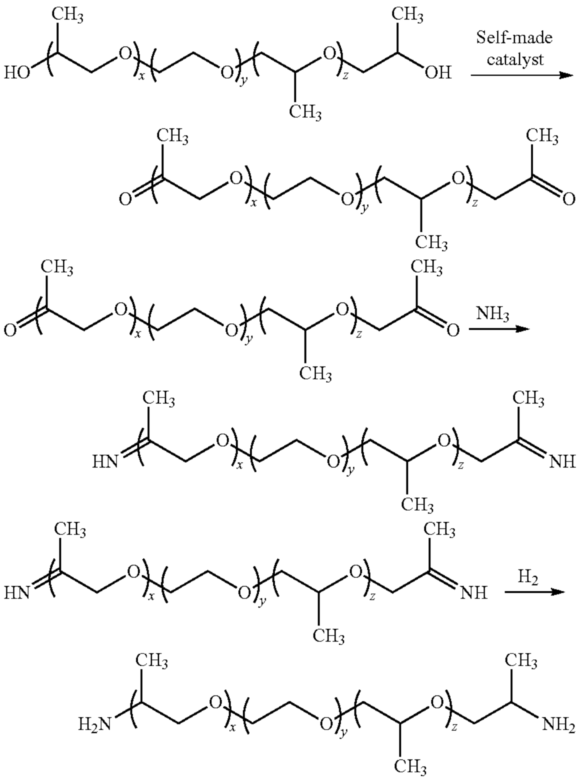

Where, y≈9, x+z≈3.6.

The synthesis of polyoxyethylene propylene diamine (ED-2003): the prepared polyether amine catalyst is added to a fixed bed reactor in advance, the hydrogen is first introduced to activate the polyether amine catalyst, propylene glycol polyether is pumped by using a raw material booster pump at a mass space speed of 0.3 $h^{-1}$, liquid ammonia is pumped by using a liquid ammonia booster pump at a mass space speed of 0.3 $h^{-1}$, and several volumes of hydrogen are introduced by using a hydrogen booster pump; then, the temperature is heated to 190° C., a hydrogen ammoniation reaction is performed by adjusting a back pressure valve under the system pressure of 10 Mpa, after the reaction is performed for a period of time, products are started to be collected, and then post-treatment is performed to obtain a polyether amine ED-2003 product; and the total amine value of the polyether amine ED-2003 obtained according to the above measurement method is greater than 55, the conversion rate may reach more than 97%, and the primary amine selectivity may reach 97.5%. Samples for testing are taken at regular intervals. Experimental results show good repeatability, and the catalyst is stable.

Embodiment 4

1. The preparation of a polyether amine catalyst: 480 g of basic nickel carbonate, 30 g of basic cupric carbonate and 20 g of basic cobalt carbonate are first added to deionized water, heated to 40° C. and stirred to cause the basic nickel carbonate, the basic cupric carbonate and the basic cobalt carbonate to be fully dissolved, so as to prepare a solution; then, an equivalent-volumetic impregnation method is used to immerse 700 g of a weighed γ-$Al_2O_3$ into the above mixed solution, rotary immersion is performed for 30 min in a 40° C. water bath, after adsorption is balanced, the temperature is heated to 90° C., vacuum dehydration and drying are performed, and then roasting is performed for 6 h at 420° C.; next, the roasted catalyst carrier is reused as a carrier, then a metal salt solution is prepared according to the same ratio, and secondary immersion, adsorption and roasting are performed; and finally, after cooling, rotary reduction is performed on the carrier after twice roasting for 70 h at 420° C. and hydrogen atmosphere in the reduction furnace, such that a self-made polyether amine catalyst (supported metal catalyst) may be obtained.

2. A synthetic chemical equation of the polyether amine is shown as follows.

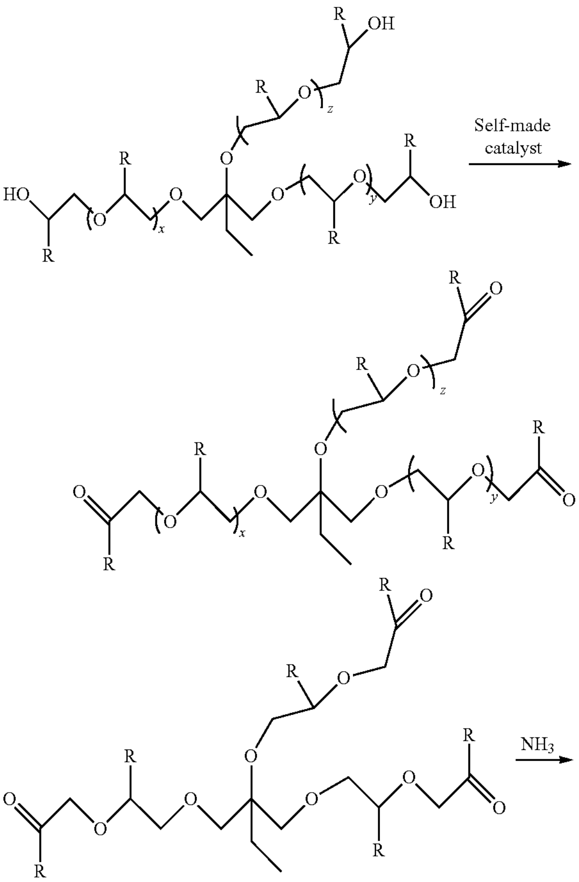

-continued

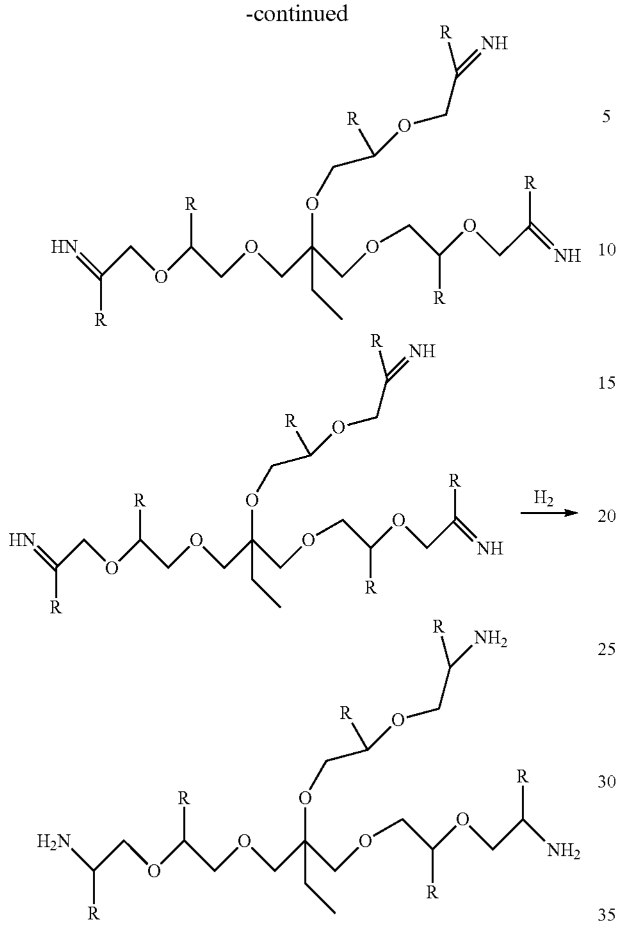

Where, R=$CH_3$, x+y+z=5.

The synthesis of trimethylolpropane polyoxypropylene triamine (T-403): the prepared polyether amine catalyst is added to a fixed bed reactor in advance, the hydrogen is first introduced to activate the polyether amine catalyst, trimethylolpropane polyether is pumped by using a raw material booster pump at a mass space speed of 0.25 $h^{-1}$, liquid ammonia is pumped by using a liquid ammonia booster pump at a mass space speed of 0.35 $h^{-1}$, and several volumes of hydrogen are introduced by using a hydrogen booster pump; then, the temperature is heated to 200° C., a hydrogen ammoniation reaction is performed by adjusting a back pressure valve under the system pressure of 11.0 Mpa, after the reaction is performed for a period of time, products are started to be collected, and then post-treatment is performed to obtain a polyether amine T-403 product; and the total amine value of the polyether amine T-403 obtained according to the above measurement method is greater than 375, the conversion rate may reach more than 98.5%, and the primary amine selectivity may reach 99.0%. Samples for testing are taken at regular intervals. Experimental results show good repeatability, and the catalyst is stable.

It can be seen, from Embodiments 1, 2, 3 and 4, that, if the supported content of nickel is higher, the activity of the catalyst is higher. In addition, the catalyst is more suitable for synthesizing the polyether amine with smaller molecular weight, such as D-230 and T-403.

After continuous operations are performed for 1000 h by using the catalyst in Embodiment 2, the activity and selectivity of the catalyst remain basically unchanged, the reaction conversion rate is 98%, and the primary amine selectivity is 99%.

Comparative Example 1

The difference between Comparative example 1 and Embodiment 2 lies in that, the catalyst of 65% Co-30% Al-5% Cu is prepared according to the method for preparing a catalyst in the embodiments of CN101522607B, and other conditions for synthesizing the polyether amine are the same as that in Embodiment 2; and after 500 h continuous operation of the catalyst, the activity of the catalyst reduces significantly, the reaction conversion rate is 85.5%, and the primary amine selectivity is 90.5%.

In conclusion, the process for preparing a polyether amine catalyst in the present invention is simple in process, green, environmentally-friendly and pollution-free in preparation process, high in catalytic activity, long in service life and wide in application range, and has an excellent application prospect. The prepared polyether amine is high in conversion rate, high in primary amine selectivity, and light in product color, such that the obtained polyether amine can have higher activity and wider application.

The above embodiments are only preferred embodiments of the present invention and cannot be used to limit the scope of protection of the present invention. Any non-substantial changes and substitutions made by a person skilled in the art on the basis of the present invention fall within the scope of protection claimed by the present invention.

What is claimed is:

1. A method for preparing a polyether amine catalyst, wherein the polyether amine catalyst is a supported metal catalyst and γ-$Al_2O_3$ is used as an alumina carrier, basic cupric carbonate, basic nickel carbonate and basic cobalt carbonate are used as precursors for supporting metals, and the polyether amine catalyst is prepared by performing twice adsorption roasting and once reduction by means of an equivalent-volumetic impregnation method, the method comprises:

S1. solution preparation: adding basic cupric carbonate, basic nickel carbonate and basic cobalt carbonate to deionized water, and performing stirring until the basic cupric carbonate, the basic nickel carbonate and the basic cobalt carbonate are completely dissolved, so as to obtain a solution A;

S2. immersion and adsorption: impregnating the alumina carrier into the solution A obtained in S1, allowing resulting mixture to stand after rotary immersion in a water bath, after a adsorption equilibrium of the alumina carrier is arrived, rising a temperature of a resulting system to 90° C., performing vacuum dehydration and drying, and then removing the alumina carrier, so as to obtain an intermediate carrier;

S3. roasting: placing the intermediate carrier obtained in S2 into a muffle furnace for temperature programming, and performing roasting at a set temperature of 420° C.;

S4. twice adsorption and roasting: using the intermediate carrier roasted in S3 as a carrier, repeating S2 and S3 for twice adsorption and roasting, wherein a metal salt ratio during a second immersion is the same as a ratio during a first immersion; and S5. reduction: after cooling, performing, at 420° C. and a hydrogen atmosphere in a reduction furnace, rotary reduction on the intermediate carrier after twice adsorption and roasting, so as to obtain the polyether amine catalyst with γ-$Al_2O_3$ as the alumina carrier.

2. The method as claimed in claim 1, wherein the water bath in S2 is at a temperature of 40° C.; the rotary immersion is performed for 30 minutes; a time for standing is 30 minutes; and the vacuum dehydration is performed when the temperature of the resulting system rises to 90° C.

3. The method as claimed in claim 1, wherein the roasting in S3 is performed for 5 hours.

4. The method as claimed in claim 1, wherein S5 comprises: placing the intermediate carrier after twice adsorption and roasting into the reduction furnace, performing rotary reduction for 60 hours at 420° C. and a high-flow hydrogen atmosphere, then decreasing the temperature in the reduction furnace to 150° C., converting hydrogen into high-pure nitrogen, and performing passivating treatment on a surface of a resulting product, so as to obtain the polyether amine catalyst with γ-$Al_2O_3$ as the alumina carrier.

5. The method as claimed in claim 1, wherein the stirring in S1 is performed at 60° C. for 30 minutes.

* * * * *